(12) United States Patent
Walkowski et al.

(10) Patent No.: US 10,041,450 B2
(45) Date of Patent: Aug. 7, 2018

(54) VALVE ASSEMBLY FOR A TANK OF A VEHICLE

(71) Applicant: Eaton Corporation, Cleveland, OH (US)

(72) Inventors: Paul Douglas Walkowski, Ann Arbor, MI (US); Vaughn Kevin Mills, Chelsea, MI (US)

(73) Assignee: Eaton Intelligent Power Limited, Dublin (IE)

( * ) Notice: Subject to any disclaimer, the term of this patent is extended or adjusted under 35 U.S.C. 154(b) by 225 days.

(21) Appl. No.: 14/570,390

(22) Filed: Dec. 15, 2014

(65) Prior Publication Data

US 2015/0144204 A1 May 28, 2015

Related U.S. Application Data

(63) Continuation of application No. PCT/US2013/074864, filed on Dec. 13, 2013.
(Continued)

(51) Int. Cl.
*F16K 24/04* (2006.01)
*F02M 25/08* (2006.01)

(52) U.S. Cl.
CPC ....... *F02M 25/0836* (2013.01); *F16K 24/044* (2013.01); *Y10T 137/3099* (2015.04)

(58) Field of Classification Search
CPC ........ F16K 24/044; F16K 24/04; F16K 24/06; F16K 27/07; Y10T 137/3099; Y10T 137/053; Y10T 137/0753; Y10T 137/0777; Y10T 137/0801; Y10T 137/0826; Y10T 137/085; Y10T 137/0874; Y10T 137/6004;
(Continued)

(56) References Cited

U.S. PATENT DOCUMENTS 1,366,171 A 1/1921 Donnelly
1,488,831 A 4/1924 Prall
(Continued)

FOREIGN PATENT DOCUMENTS

CN 2849348 Y 12/2006
EP 1325829 B1 8/2009
(Continued)

OTHER PUBLICATIONS

European Patent Office: International Search Report and Written Opinion issued in International Application No. PCT/US2013/031030. dated Aug. 13, 2013. 13 pages.

*Primary Examiner* — Craig J Price
(74) *Attorney, Agent, or Firm* — Quinn IP Law

(57) ABSTRACT

A valve assembly for a tank of a vehicle is disclosed. A valve body is adapted to be attached to the tank. A seat is disposed inside the valve body and defines an outlet for venting the tank. A float is disposed inside the valve body and is movable between a first position and a second position relative to the valve body in response to a liquid fluid level inside the tank. A support is coupled to the float and is movable with the float between the first and second positions. A sealing member is attached to the support and has an engagement portion supported by a base to define a space between the engagement portion and the support to allow movement of the engagement portion between an initial position when in the first position and a displaced position when in the second position.

21 Claims, 4 Drawing Sheets

Related U.S. Application Data

(60) Provisional application No. 61/745,673, filed on Dec. 24, 2012.

(58) Field of Classification Search
CPC ..... Y10T 137/86324; Y10T 137/86332; Y10T 137/7358; Y10T 137/7404; Y10T 137/7423; F02M 25/0836; F02M 37/0017; F02M 37/0076; F16L 47/02; F16L 47/14
USPC ..... 137/43, 202, 39, 38, 315.08, 15.26, 587, 137/588, 409, 423, 429, 422; 220/86.2, 220/745, 746; 96/158, 165
See application file for complete search history.

(56) References Cited

U.S. PATENT DOCUMENTS

| | | | |
|---|---|---|---|
| 2,017,033 A | 10/1935 | McGuffin | |
| 2,744,539 A | 5/1956 | Jones | |
| 3,366,137 A | 1/1968 | Hansen | |
| 3,586,032 A | 6/1971 | Weinstein | |
| 3,613,720 A | 10/1971 | Welch | |
| 3,752,366 A | 8/1973 | Lawrence, Jr. | |
| 3,883,111 A | 5/1975 | Jourdan | |
| 4,982,757 A | 1/1991 | Ohasi et al. | |
| 5,090,533 A | 2/1992 | Inoue | |
| 5,265,283 A * | 11/1993 | Pourcier | E03D 1/142 4/410 |
| 5,313,977 A | 5/1994 | Bergsma | |
| 5,590,697 A * | 1/1997 | Benjey | B60K 15/03519 137/202 |
| 5,638,856 A | 6/1997 | Ohsaki | |
| 5,678,590 A * | 10/1997 | Kasugai et al. | 137/202 |
| 5,738,132 A | 4/1998 | Zakai et al. | |
| 5,782,258 A * | 7/1998 | Herbon | B60K 15/03519 137/202 |
| 5,950,659 A * | 9/1999 | Szlaga et al. | 137/202 |
| 5,960,816 A * | 10/1999 | Mills et al. | 137/202 |
| 5,992,441 A * | 11/1999 | Enge et al. | 137/202 |
| 6,035,883 A * | 3/2000 | Benjey | 137/202 |
| 6,058,963 A | 5/2000 | Enge et al. | |
| 6,371,146 B1 * | 4/2002 | Benjey | 137/202 |
| 6,450,192 B1 * | 9/2002 | Romanek | 137/202 |
| 6,508,263 B1 * | 1/2003 | Jahnke et al. | 137/202 |
| 6,517,076 B1 | 2/2003 | Menage | |
| 6,691,725 B2 * | 2/2004 | Zorine | 137/202 |
| 6,742,536 B2 * | 6/2004 | Mills | 137/15.17 |
| 6,810,900 B2 | 11/2004 | Kato | |
| 6,860,285 B2 | 3/2005 | Ehrman et al. | |
| 7,083,062 B2 * | 8/2006 | Zorine | 123/516 |
| 7,146,729 B2 * | 12/2006 | Spink et al. | 137/202 |
| 7,201,155 B2 * | 4/2007 | Mills | 123/520 |
| 7,527,064 B2 * | 5/2009 | Kito et al. | 137/39 |
| 7,607,450 B2 | 10/2009 | Park | |
| 7,614,417 B2 * | 11/2009 | Simon et al. | 137/202 |
| 7,717,126 B2 * | 5/2010 | Tagami et al. | 137/43 |
| 7,770,593 B2 * | 8/2010 | Moses | 137/202 |
| 7,770,594 B2 | 8/2010 | Kishi | |
| 7,784,484 B2 * | 8/2010 | Furuya | 137/202 |
| 7,963,296 B2 | 6/2011 | Kaneko | |
| 8,141,576 B2 * | 3/2012 | Matsuo | 137/202 |
| 8,689,816 B2 * | 4/2014 | Pifer | 137/202 |
| 8,770,218 B2 * | 7/2014 | Tagami et al. | 137/202 |
| 8,826,947 B2 * | 9/2014 | Hirose et al. | 137/202 |
| 8,870,020 B2 | 10/2014 | Eckstein et al. | 220/746 |
| 2001/0050104 A1 * | 12/2001 | Nishi | B60K 15/03519 137/202 |
| 2003/0098063 A1 * | 5/2003 | Mori et al. | 137/202 |
| 2003/0116190 A1 | 6/2003 | Szlaga | |
| 2004/0045602 A1 | 3/2004 | Palvolgyi et al. | |
| 2004/0089340 A1 * | 5/2004 | Muto et al. | 137/202 |
| 2005/0055817 A1 * | 3/2005 | Spink et al. | 29/434 |
| 2006/0213553 A1 * | 9/2006 | Mills et al. | 137/43 |
| 2007/0000542 A1 | 1/2007 | Johansen | |
| 2007/0068574 A1 * | 3/2007 | Kito | F16K 1/36 137/202 |
| 2007/0163651 A1 * | 7/2007 | Quintman et al. | 137/202 |
| 2009/0178719 A1 * | 7/2009 | Matsuo | F16K 31/22 137/409 |
| 2011/0017320 A1 * | 1/2011 | Kito et al. | 137/423 |
| 2011/0139301 A1 * | 6/2011 | Hirose et al. | 141/199 |
| 2011/0203678 A1 | 8/2011 | Servin | |
| 2014/0224820 A1 * | 8/2014 | Honda et al. | 220/746 |
| 2015/0090346 A1 | 4/2015 | Erdmann et al. | |
| 2015/0107689 A1 * | 4/2015 | Walkowski | B60K 15/03519 137/202 |

FOREIGN PATENT DOCUMENTS

| | | |
|---|---|---|
| EP | 2163757 A1 | 3/2010 |
| GB | 2300246 A | 10/1996 |
| JP | 2006233929 A * | 9/2006 |
| JP | 2007120490 A | 5/2007 |
| WO | 9721561 A1 | 6/1997 |

* cited by examiner

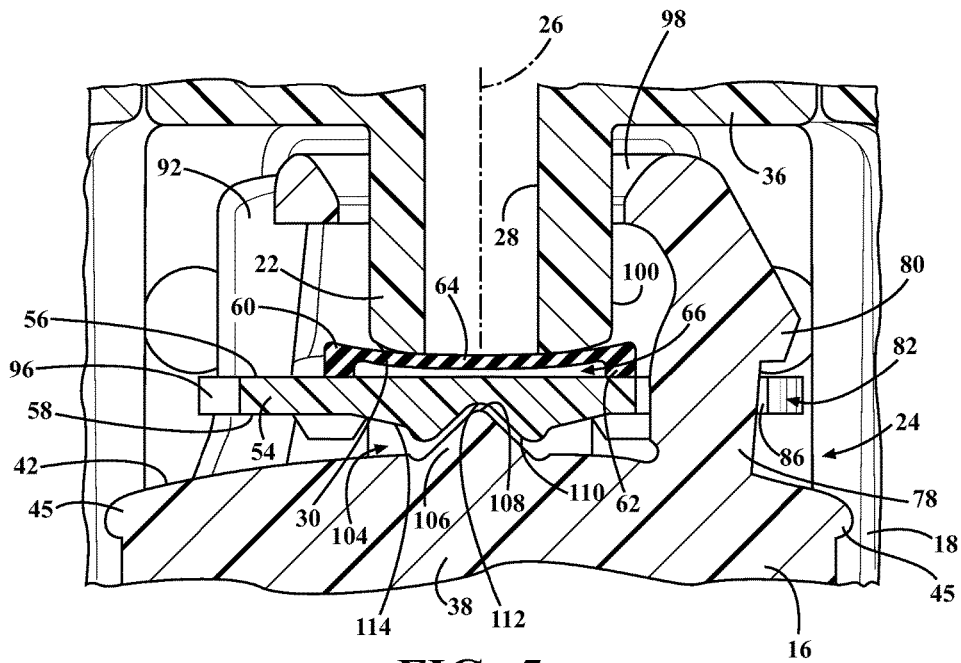
FIG. 5
FIG. 6
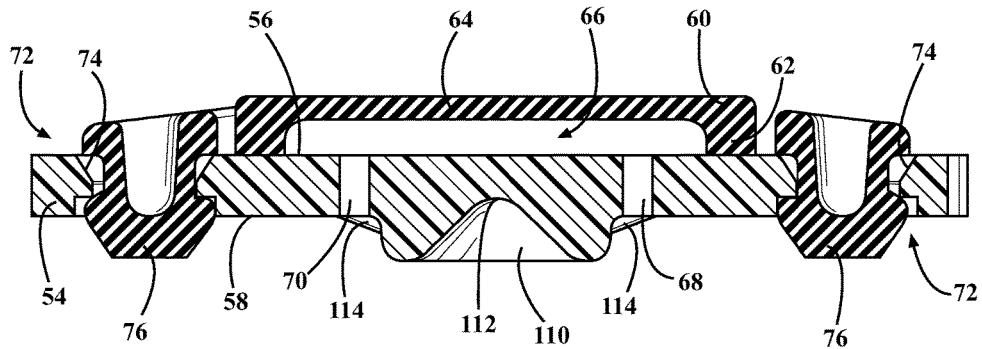

VALVE ASSEMBLY FOR A TANK OF A VEHICLE

CROSS-REFERENCE TO RELATED APPLICATIONS

This application is a bypass continuation application of International Application No. PCT/US2013/074864 filed Dec. 13, 2013, which claims priority to U.S. Provisional Application No. 61/745,673 filed Dec. 24, 2012.

TECHNICAL FIELD

The present teachings generally include a valve assembly for a tank of a vehicle.

BACKGROUND

Fuel tank valves that function to vent vapors from a fuel tank are known. Generally, the vapors are vented to a canister that stores the vapors and is periodically purged. Fuel tank valves are configured to prevent liquid fuel in the fuel tank from entering the canister even when a vehicle is parked on a grade.

SUMMARY

The present teachings generally include a valve assembly for a tank of a vehicle. The valve assembly includes a valve body adapted to be attached to the tank. The valve body includes a seat disposed inside the valve body. The seat defines an outlet for venting the tank. The valve assembly also includes a float disposed inside the valve body. The float is movable between a first position and a second position relative to the valve body in response to a liquid fluid level inside the tank. The valve assembly further includes a support coupled to the float. The support is movable with the float between the first and second positions. In addition, the valve assembly includes a sealing member attached to the support and having a base abutting the support. The sealing member has an engagement portion supported by the base to define a space between the engagement portion and the support to allow movement of the engagement portion between an initial position when the float is in the first position and a displaced position when the float is in the second position. The engagement portion is spaced from the seat when in the initial position to allow fluid communication through the outlet. The engagement portion engages the seat when in the displaced position such that the space decreases in size and the engagement portion deforms about the seat to cover the outlet and minimize fluid communication through the outlet.

The float and the support can include a centering mechanism for centering the support relative to a longitudinal axis to position the engagement portion of the sealing member relative to the seat.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 5 is a schematic fragmentary cross-sectional view of the valve assembly with the float in a second position and the engagement portion of the sealing member in a displaced position.

FIG. 6 is a schematic cross-sectional view of a support and the sealing member.

DETAILED DESCRIPTION

Figure 1:
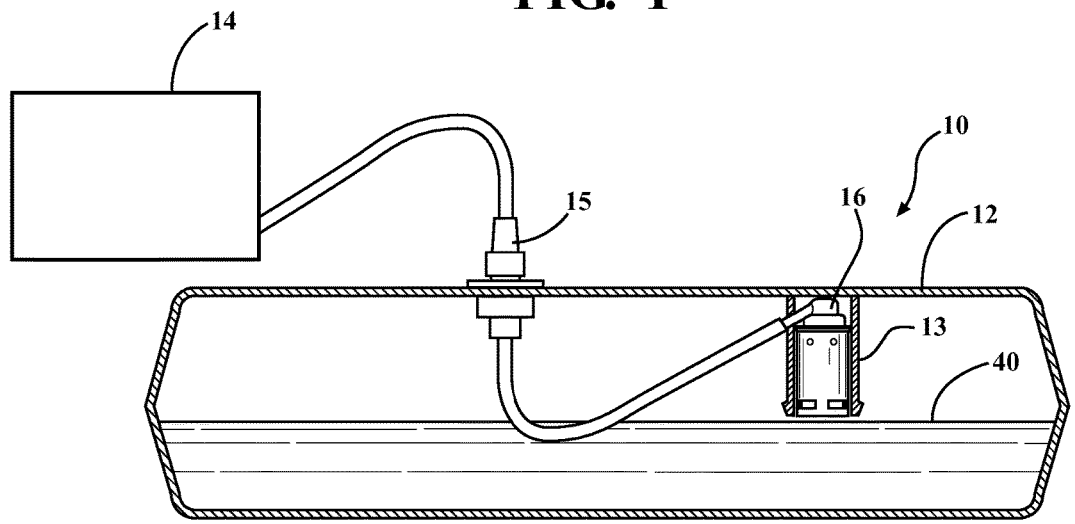
FIG. 1 is a schematic partial cross-sectional side illustration of a valve assembly internally mounted to a tank, with a vapor control structure cooperating with the valve assembly.
Figure 2:
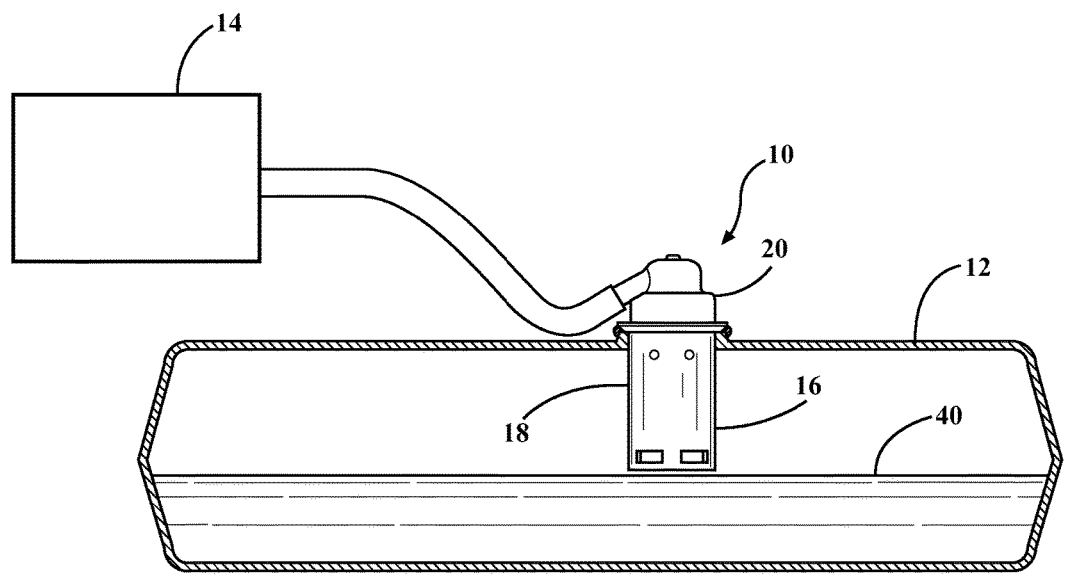
FIG. 2 is a schematic partial cross-sectional side illustration of the valve assembly externally mounted to the tank, with the vapor control structure cooperating with the valve assembly.

Referring to the Figures, wherein like numerals indicate like or corresponding parts throughout the several views, a valve assembly 10 for a tank 12 of a vehicle is generally shown in FIGS. 1 and 2. In certain embodiments, the tank 12 can be a fuel tank 12 of the vehicle. Therefore, liquid fluid, such as fuel can be stored in the tank 12. It is to be appreciated that the valve assembly 10 can be utilized with tanks 12 other than fuel tanks 12. For example, the valve assembly 10 can be mounted to a urea tank in a vehicle. Therefore, other liquid fluids can be stored in the tank 12.

Generally, the valve assembly 10 is attached to the tank 12. The valve assembly 10 can be internally mounted to the tank 12 as shown in FIG. 1 or externally mounted to the tank 12 as shown in FIG. 2. For the internally mounted valve assembly 10, the assembly 10 can be supported by a bracket 13 inside the tank 12. For the externally mounted valve assembly 10, a portion of the valve assembly 10 is disposed inside the tank 12 and another portion of the valve assembly 10 is disposed outside of the tank 12 as shown in FIG. 2. The features of the valve assembly 10 discussed herein are the same for the internally mounted valve assembly 10 and the externally mounted valve assembly 10. It is to be appreciated that other components can be utilized with the internally or externally mounted valve assembly 10, such as, for example, a nipple 15 (see FIG. 1) that can extend through the tank 12 to couple the internally mounted valve assembly 10 inside the tank 12 to components outside of the tank 12.

Generally, the valve assembly 10 allows vapor that build up in the tank 12 to be vented out of the tank 12 to a vapor control structure 14. The vapor control structure 14 can store the vapor received from the tank 12 and can be periodically purged. Therefore, under certain conditions, the vapors move or flow from the tank 12 through the valve assembly 10 and into the vapor control structure 14. It is to be appreciated that the vapor control structure 14 can be referred to as a canister, such as a charcoal canister.

Figure 3:
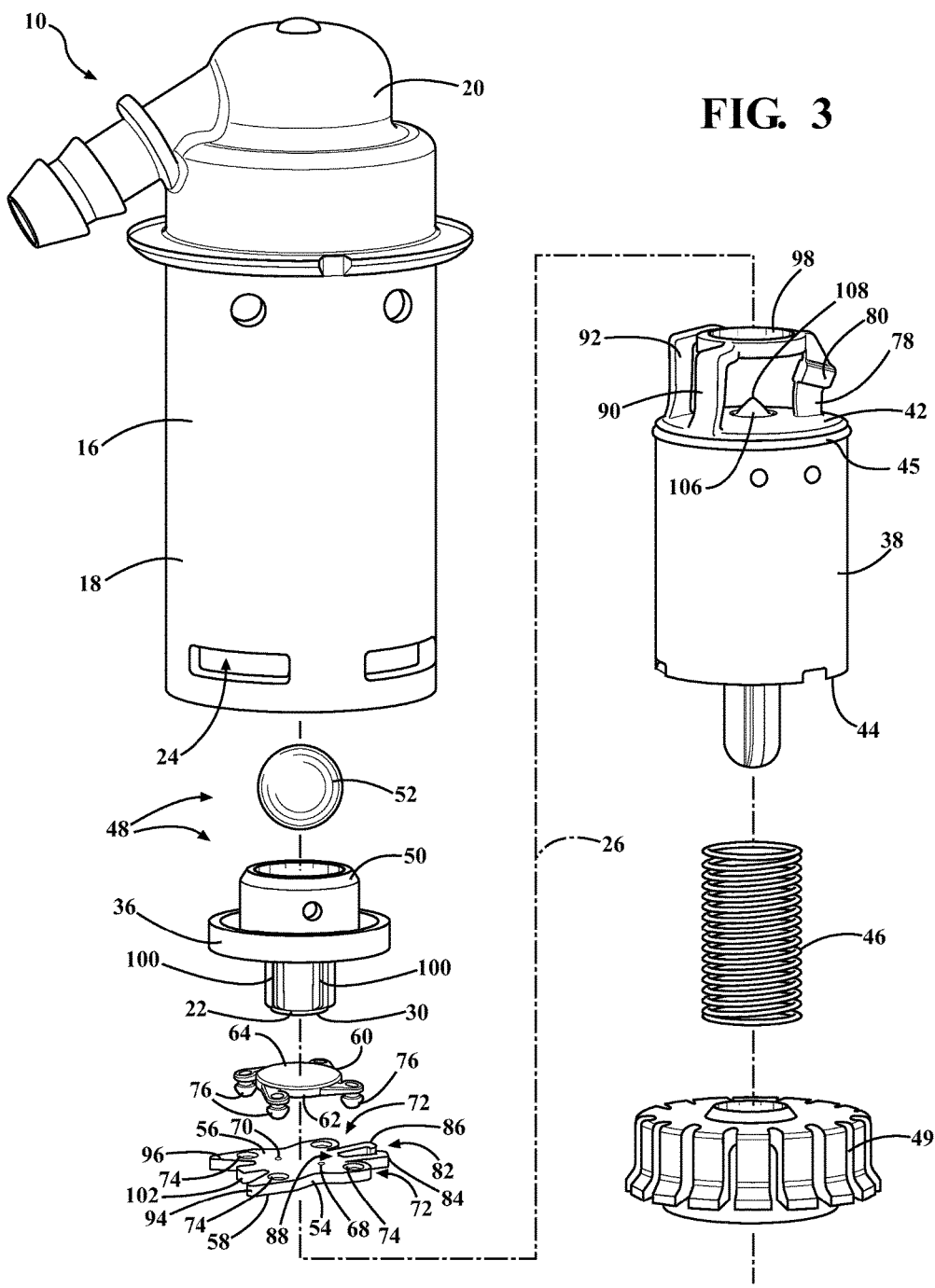
FIG. 3 is a schematic perspective exploded view of the valve assembly.

Referring to FIGS. 1-3, the valve assembly 10 includes a valve body 16 adapted to be attached to the tank 12. Simply stated, the valve body 16 is attached or mounted to the tank 12 either internally or externally as discussed above. For the externally mounted valve assembly 10 as shown in FIG. 2, a first portion 18 of the valve body 16 is disposed inside of the tank 12 and a second portion 20 of the valve body 16 is disposed outside of the tank 12. Therefore, generally, the vapors vented out of the tank 12 move or flow from the first portion 18 into the second portion 20 and out to the vapor control structure 14.

Figure 4:
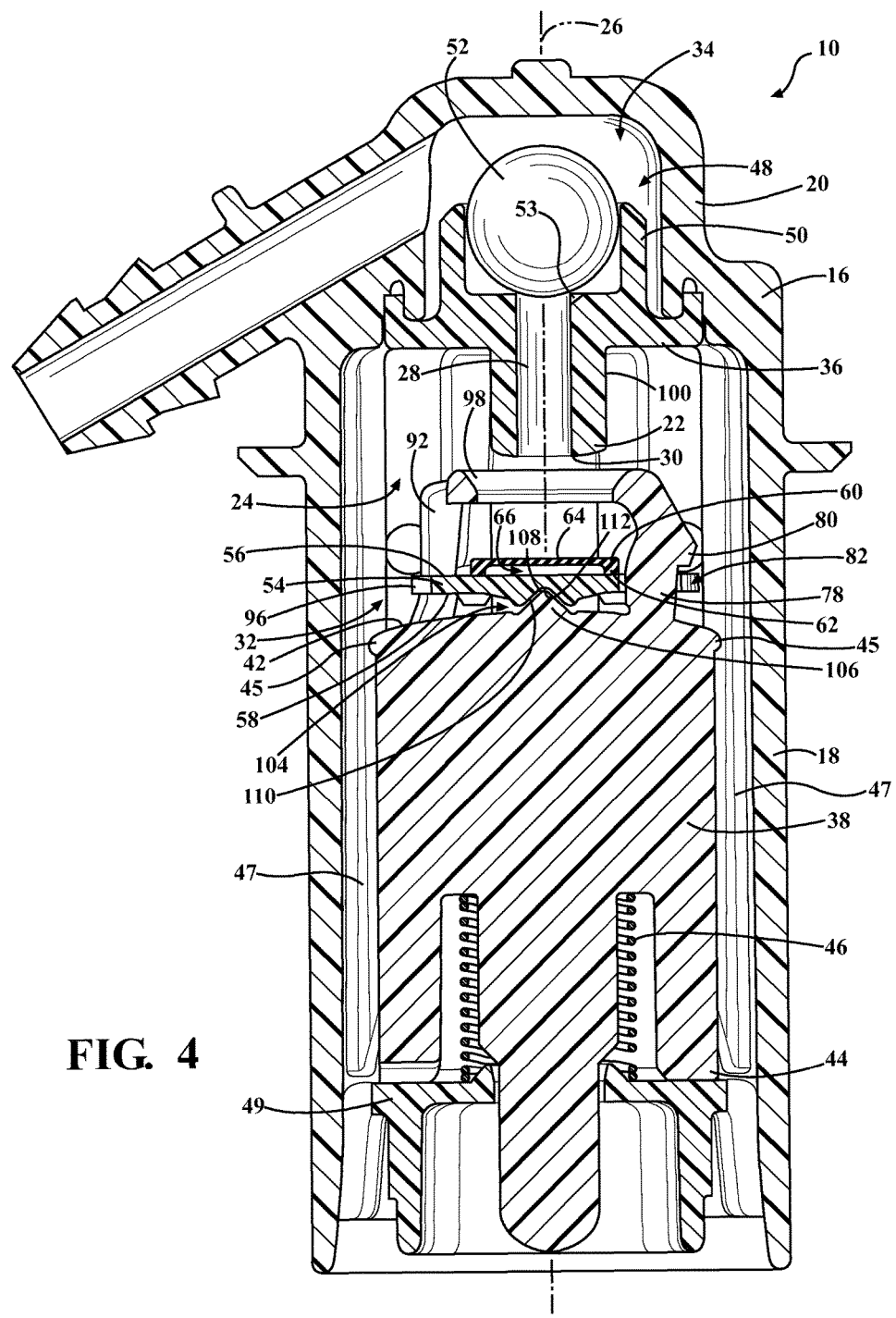
FIG. 4 is a schematic cross-sectional view of the valve assembly with a float in a first position and an engagement portion of a sealing member in an initial position.

Turning to FIGS. 3-5, the valve body 16 includes a seat 22 disposed inside the valve body 16. The seat 22 will be referred to as a first seat 22 for the below discussion. The valve body 16 can define a cavity 24 along a longitudinal axis 26, with the first seat 22 disposed in the cavity 24. The first seat 22 can be coupled to the first and/or second portion 18, 20 of the valve body 16. As shown in FIGS. 4 and 5, in certain embodiments, the first seat 22 can be attached to the second portion 20 of the valve body 16. The first seat 22 can be attached to the first and/or second portion 18, 20 by a snap fit, fasteners, tabs, etc. It is to be appreciated that the first seat 22 can be integrally formed with the valve body 16. In other words, the first seat 22 and the valve body 16 can be formed of one piece.

As best shown in FIG. 4, generally, the first seat 22 defines an outlet 28 for venting the tank 12. Therefore, the outlet 28 and the cavity 24 can be in fluid communication with each other and in fluid communication with the vapor control structure 14 for venting the vapor out of the tank 12 and into the vapor control structure 14. The outlet 28 can be disposed along the longitudinal axis 26. The first seat 22 can present an end face 30 further defining the outlet 28 and will be discussed further below.

The first seat 22 can be attached or mounted to the valve body 16 such that the cavity 24 is split into a first cavity portion 32 and a second cavity portion 34. Generally, the first cavity portion 32 is disposed in the first portion 18 of the valve body 16 and the second cavity portion 34 is disposed in the second portion 20 of the valve body 16. Therefore, the vapors move or flow from the first cavity portion 32 through the outlet 28 and into the second cavity portion 34. Simply stated, the outlet 28 is disposed between the first and second cavity portions 32, 34.

The valve body 16 can further include a plate 36 supporting the first seat 22 and further splitting or separating the cavity 24 into the first and second cavity portions 32, 34. The first seat 22 can extend outwardly from the plate 36 into the first cavity portion 32. The plate 36 can be coupled to the first and/or second portions 18, 20 of the valve body 16 such that the plate 36 is sealed to the first and/or second portions 18, 20. Therefore, fluid cannot seep between the plate 36 and the valve body 16. As shown in FIG. 4, the plate 36 can be attached to the second portion 20 of the valve body 16. The plate 36 can be attached to the first and/or second portions 18, 20 by a snap fit, fasteners, tabs, etc. It is to be appreciated that the plate 36 and the first seat 22 can be integrally formed to each other. In other words, the plate 36 and the first seat 22 can be formed of one piece. Furthermore, it is to be appreciated that the plate 36, the first seat 22 and the valve body 16 can be integrally formed to each other or formed of one piece.

Referring to FIGS. 3 and 4, the valve assembly 10 further includes a float 38 disposed inside the valve body 16. More specifically, the float 38 is disposed in the cavity 24 and is movable relative to the first seat 22. Generally, the float 38 can be movable along the longitudinal axis 26. Specifically, the float 38 is movable between a first position and a second position relative to the valve body 16 in response to a liquid fluid level 40 (see FIGS. 1 and 2) inside the tank 12. In other words, when the float 38 is combined with a biasing force, which is discussed further below, the float 38 is buoyant in the liquid fluid, such as fuel, stored in the tank 12. Thus, the float 38 can move along the longitudinal axis 26 depending on the liquid fluid level 40 of the fuel inside the tank 12. For example, if the liquid fluid level 40 rises, the float 38 moves toward the first seat 22 and the plate 36. As another example, if the liquid fluid level 40 descends, the float 38 moves away from the first seat 22 and the plate 36. The float 38 is shown in the first position in FIG. 4 and the float 38 is shown in the second position in FIG. 5.

Continuing with FIGS. 3 and 4, the float 38 can include a first end 42 and a second end 44 spaced from each other along the longitudinal axis 26. Generally, the first end 42 faces the first seat 22 and the second end 44 opposes the first end 42. More specifically, the first end 42 of the float 38 and the end face 30 of the first seat 22 face each other. The float 38 can include a bulge 45 disposed between the first and second ends 42, 44, with the bulge 45 surrounding the float 38 to assist in aligning or centering the float 38 relative to the first seat 22.

Generally, the bulge 45 extends outwardly away from the longitudinal axis 26 and faces the inner surface of the first portion 18 of the valve body 16. In one embodiment, the bulge 45 is disposed adjacent to the first end 42 of the float 38. For example, the bulge 45 assists in aligning or centering the float 38 along the longitudinal axis 26 as the float 38 moves between the first and second positions, which aligns or centers the float 38 relative to the first seat 22. Therefore, the bulge 45 can minimize transverse movement of the float 38 relative to the longitudinal axis 26. In other words, the bulge 45 and the valve body 16 cooperate to minimize play in the float 38. It is to be appreciated that the valve body 16 can include one or more fins 47 disposed in the first cavity portion 32 such that the fins 47 are disposed between the inner surface of the valve body 16 and the float 38. Therefore, the bulge 45 can selectively engage the valve body 16 or the fins 47 during movement of the float 38 between the first and second positions. It is to be appreciated that the bulge 45 and the fins 47 can be any suitable configuration.

The valve assembly 10 can further include a biasing member 46 engaging the second end 44 of the float 38 to continuously bias the float 38 toward the first seat 22 or the plate 36. In other words, the biasing member 46 applies the biasing force to the float 38 as discussed above. The biasing force overcomes the weight of the float 38 and frictional forces between the float 38 engaging the fins 47 as the float 38 moves between the first and second positions. The valve body 16 can include an end cap 49 that generally closes the first cavity portion 32 and the biasing member 46 can engage the end cap 49. The end cap 49 remains stationary as the float 38 moves between the first and second positions. The end cap 49 generally contains the float 38 inside the first cavity portion 32 and provides a surface for the biasing member 46 to react against. The end cap 49 is spaced from the first seat 22 and can define an opening for an extension of the float 38 to be movable through the opening. It is to be appreciated that in a vehicle roll-over situation, the float 38 will move to the second position without the buoyancy of the float 38 affecting the float's position due to the biasing force applied to the float 38 overcoming the buoyancy of the float 38, the weight of the float 38, and the frictional forces between the float 38 engaging the fins 47. Therefore, when in the vehicle roll-over situation, the biasing member 46 assists in maintaining the float 38 in the second position. In certain embodiments, the biasing member 46 can be a spring, such as a coil spring. It is to be appreciated that the biasing member 46 can be any suitable configuration to continuously bias the float 38 toward the first seat 22.

Optionally, as shown in FIGS. 3 and 4, the valve assembly 10 can include a head valve 48 disposed in the second cavity portion 34. The head valve 48 can include a second seat 50 opposing the first seat 22, with the second seat 50 extending outwardly from the plate 36 into the second cavity portion 34. It is to be appreciated that the plate 36 and the second seat 50 can be integrally formed to each other. In other words, the plate 36 and the second seat 50 can be formed of one piece. Furthermore, it is to be appreciated that the plate 36, the first and second seats 22, 50 and the valve body 16 can be integrally formed to each other or formed of one piece. It is to be appreciated that in a urea tank application, the head valve 48 can be eliminated.

The head valve 48 can also include a blocking member 52 movably disposed in the second seat 50 such that the blocking member 52 selectively closes the outlet 28. Generally, the blocking member 52 rests in the second seat 50 to close the outlet 28 while the float 38 is in the first position. The blocking member 52 moves away from the second seat 50 to open the outlet 28 when vapor pressure in the tank 12 exceeds a predetermined pressure while the float 38 is in the first position. When the blocking member 52 moves away from the second seat 50, vapors can vent through the outlet 28 into the vapor control structure 14. For example, the blocking member 52 can move away from the second seat 50 to open the outlet 28 during refueling when there is a large pressure differential between the tank 12 and the second cavity portion 34. In certain embodiments, the blocking member 52 can be a ball as shown in FIGS. 3 and 4. It is to be appreciated that the blocking member 52 can be any suitable configuration. The head valve 48 can also be referred to as a pressure relief valve.

The second seat 50 can define a notch 53 (see FIG. 4) adjacent to the outlet 28 to allow a small amount of fluid communication between the first and second cavity portions 32, 34 when the blocking member 52 engages the outlet 28. In other words, when the blocking member 52 engages the outlet 28, the notch 53 allows a small amount of vapor to communicate between the first and second cavity portions 32, 34 such that small pressure differentials between the first and second cavity portions 32, 34 can be equalized. Generally, the notch 53 can be referred to as a bleed notch 53.

Referring to FIGS. 3, 4 and 6, the valve assembly 10 also includes a support 54 coupled to the float 38. In certain embodiments, the support 54 is coupled to the first end 42 of the float 38. The support 54 is movable with the float 38 between the first and second positions. Furthermore, the support 54 is movable independently of the float 38 as discussed further below. The support 54 can have a first side 56 and a second side 58 opposing the first side 56 which is also discussed further below.

In addition, continuing with FIGS. 3, 4 and 6, the valve assembly 10 includes a sealing member 60 attached to the support 54. It is to be appreciated that the sealing member 60 and the support 54 can be separate components attached to one another or integrally formed to each other such that the sealing member 60 and the support 54 are formed of one-piece. The sealing member 60 has a base 62 abutting the support 54. In certain embodiments, the base 62 abuts one of the first and second sides 56, 58 of the support 54. In one embodiment, the base 62 abuts the first side 56 of the support 54. The support 54 and the sealing member 60 cooperate to define a drum seal or a flapper. The drum seal 54, 60 provides improved opening and closing features of the outlet 28. For example, the drum seal 54, 60 fully opens quickly when the float 38 moves from the second position back to the first position to provide fully open fluid communication through the outlet 28. In other words, the drum seal 54, 60 peels away from the first seat 22 crisply such that the sealing member 60 does not flutter partially engaging the first seat 22 and thus partially covering the outlet 28. Said differently, the drum seal 54, 60 pops off of the first seat 22 as the float 38 moves from the second position back to the first position.

The sealing member 60 also has an engagement portion 64 supported by the base 62 to define a space 66 between the engagement portion 64 and the support 54 to allow movement of the engagement portion 64 between an initial position when the float 38 is in the first position and a displaced position when the float 38 is in the second position. More specifically, the space 66 can be defined between the engagement portion 64 and one of the first and second sides 56, 58 of the support 54 to allow movement of the engagement portion 64 between the initial position and the displaced position. Generally, the float 38 is in the first position when the engagement portion 64 is spaced from the first seat 22 to allow fluid communication through the outlet 28. The float 38 is in the second position when the engagement portion 64 engages the first seat 22 such that the engagement portion 64 seals the outlet 28 to minimize fluid communication through the outlet 28, and more specifically, minimize fuel or vapor in the tank 12 from entering the vapor control structure 14. Therefore, for example, when the float 38 is in the second position, the engagement portion 64 engages the first seat 22 such that the engagement portion 64 seals the outlet 28 to prevent fuel or vapor in the tank 12 from entering the vapor control structure 14. The sealing member 60 closes the outlet 28 quickly and crisply such that the sealing member 60 does not flutter partially engaging the first seat 22 and thus partially covering the outlet 28.

In various embodiments, as shown in FIGS. 4-6, the engagement portion 64 and the first side 56 of the support 54 define the space 66. Furthermore, in certain embodiments, the base 62, the engagement portion 64 and the first side 56 of the support 54 further define the space 66 or pocket as best shown in FIG. 6. Referring to FIG. 4, the engagement portion 64 is spaced from the first seat 22 when in the initial position to allow fluid communication through the outlet 28. As shown in FIG. 5, the engagement portion 64 engages the first seat 22 when in the displaced position such that the space 66 decreases in size and the engagement portion 64 deforms about the first seat 22 to cover the outlet 28 and minimize fluid communication through the outlet 28. Therefore, if the vehicle is partially/fully rolled over, the float 38 can move to the second position and the engagement portion 64 to the displaced position, and thus the engagement portion 64 will engage the first seat 22 to seal the outlet 28, which minimizes fuel and vapor in the tank 12 from entering into the vapor control structure 14. Furthermore, if the liquid fluid level 40 is relatively high in the tank 12 and/or the vehicle is on a grade, the liquid fluid or fuel shifts in the tank 12 which can also cause the float 38 to move to the second position and the engagement portion 64 to the displaced position, and thus the engagement portion 64 will engage the first seat 22 to seal the outlet 28, which minimizes fuel and vapor in the tank 12 from entering into the vapor control structure 14. Liquid fluid or fuel could affect or saturate the vapor control structure 14 if the liquid fluid or fuel reaches the vapor control structure 14. Therefore, for example, the engagement portion 64 and the first seat 22 cooperate to seal the outlet 28 when in the displaced position to prevent liquid fluid or fuel in the tank 12 from entering the vapor control structure 14.

More specifically, the engagement portion 64 engages the end face 30 of the first seat 22 when in the displaced position. Therefore, when the engagement portion 64 is in the displaced position, the engagement portion 64 covers the end face 30 of the first seat 22 to minimize fluid communication through the outlet 28. Simply stated, the engagement portion 64 flexes or deforms about the first seat 22, and more specifically, flexes or deforms about the end face 30 of the first seat 22, to cover the outlet 28 and minimize fuel and vapor in the tank 12 from entering into the vapor control structure 14. Therefore, for example, the engagement portion 64 can engage the end face 30 of the first seat 22 to prevent fuel and vapor in the tank 12 from entering the vapor control structure 14. The engagement portion 64 can be deformed by the first seat 22 such that the engagement portion 64 remains spaced from the support 54, and more specifically, spaced from the first side 56 of the support 54. Alternatively, the engagement portion 64 can be deformed by the first seat 22 until the engagement portion 64 engages the first side 56 of the support 54 such that the engagement portion 64 is sandwiched between the end face 30 of the first seat 22 and the first side 56 of the support 54.

At least a segment of the sealing member 60 can be formed of a flexible material. In certain embodiments, the entire sealing member 60 is formed of the flexible material. For example, the segment of the sealing member 60 can be the engagement portion 64. Therefore, the sealing member 60 or the engagement portion 64 can be formed of an elastomer. One suitable elastomer is a fluorinated elastomer. In certain embodiments, the elastomer is fluorosilicone. It is to be appreciated that any other suitable flexible material can be utilized.

As mentioned above, the sealing member 60 can be formed of flexible material, therefore, the sealing member 60 or the engagement portion 64 is elastically deformable or reversibly deformable. Said differently, the sealing member 60 or the engagement portion 64 is resilient, and thus, after deformation, the sealing member 60/engagement portion 64 returns to its original configuration. Furthermore, the flexible material for the base 62 can be thicker than the flexible material for the engagement portion 64 such that the engagement portion 64 deforms more readily than the base 62. Therefore, when the engagement portion 64 is in the displaced position, the engagement portion 64 is deformed, and when the engagement portion 64 is in the initial position, the engagement portion 64 returns back to its original configuration. Thus, if the vehicle is partially/fully rolled over, the float 38 can move to the second position and the engagement portion 64 to the displaced position such that the engagement portion 64 deforms around the end face 30 of the first seat 22 to seal the outlet 28, which minimizes fuel and vapor in the tank 12 from entering into the vapor control structure 14. Furthermore, if the liquid fluid level 40 is relatively high in the tank 12 and the vehicle is on the grade, the liquid fluid or fuel shifts in the tank 12 which can also cause the float 38 to move to the second position and the engagement portion 64 to the displaced position such that the engagement portion 64 deforms around the end face 30 of the first seat 22 to seal the outlet 28, which minimizes fuel and vapor in the tank 12 from entering into the vapor control structure 14. In addition, if the vehicle is being driven such that the fuel is sloshing around in the tank 12, the engagement portion 64 can engage the end face 30 of the first seat 22 to seal the outlet 28 to minimize fuel in the tank 12 from entering the vapor control structure 14. As discussed above, liquid fluid or fuel could affect or saturate the vapor control structure 14 if the liquid fluid or fuel reaches the vapor control structure 14. Therefore, for example, the engagement portion 64 and the end face 30 of the first seat 22 cooperate to seal the outlet 28 when in the displaced position to prevent liquid fluid or fuel in the tank 12 from entering the vapor control structure 14.

Optionally, the engagement portion 64 can include a treated surface facing the first seat 22 to selectively engage the end face 30 of the first seat 22. In other words, the treated surface is disposed on the side of the engagement portion 64 that faces the end face 30 of first seat 22. The treated surface can assist in allowing the engagement portion 64 to peel away from the first seat 22 when the sealing member 60 is moving to the initial position, and more specifically, peel away from the end face 30 of the first seat 22. In other words, the treated surface can assist in quickly peeling away the sealing member 60 from the first seat 22 such that the sealing member 60 does not flutter partially engaging the first seat 22. The treated surface can be textured and/or have a coating applied thereon. For example, the engagement portion 64 can be micro-machined to create the textured surface. The textured surface can be ribs, knobs, moguls, etc. As another example, the engagement portion 64 can be a low friction treated surface or a liquid-repellant treated surface.

Turning to FIG. 6, the support 54 can define a first hole 68 through the first and second sides 56, 58 such that the space 66 is in fluid communication with inside of the valve body 16 to equalize pressure between the space 66 and inside of the valve body 16 when the engagement portion 64 moves between the initial and displaced positions. More specifically, the first hole 68 equalizes pressure between the space 66 and the cavity 24, and specifically equalizes pressure between the space 66 and the first cavity portion 32 of the cavity 24. For example, when the engagement portion 64 engages the first seat 22, fluid (gaseous and/or liquid fluid) is expelled out of the space 66 through the first hole 68 as the space 66 decreases in size. When the engagement portion 64 disengages the first seat 22, fluid enters the space 66 through the first hole 68 such that the engagement portion 64 returns to its original configuration in the initial position.

Continuing with FIG. 6, additionally, the support 54 can define a second hole 70 through the first and second sides 56, 58 such that the space 66 is in fluid communication with inside of the valve body 16 to equalize pressure between the space 66 and inside of the valve body 16 when the engagement portion 64 moves between the initial and displaced positions. More specifically, the second hole 70 equalizes pressure between the space 66 and the cavity 24, and specifically equalizes pressure between the space 66 and the first cavity portion 32 of the cavity 24. Generally, the first and second holes 68, 70 are spaced from each other. It is to be appreciated that any suitable number of holes 68, 70 can be utilized for equalizing pressure between the space 66 and the cavity 24. Furthermore, in addition to, or alternatively to having one or more holes 68, 70, the first side 56 of the support 54 can define one or more serrations, saw teeth, etc. along the base 62 of the sealing member 60 to equalize pressure between the space 66 and the cavity 24.

As shown in FIG. 6, the base 62 of the sealing member 60 surrounds the first and second holes 68, 70. Therefore, as indicated above, fluid communication between the space 66 and the cavity 24 is provided through the first and/or second holes 68, 70. As such, when the engagement portion 64 engages the first seat 22, fluid (gaseous and/or liquid fluid) is expelled out of the space 66 through the first and/or second holes 68, 70 as the space 66 decreases in size. When the engagement portion 64 disengages the first seat 22, fluid enters the space 66 through the first and/or second holes 68, 70 such that the engagement portion 64 returns to its original configuration in the initial position. Simply stated, the first and second holes 68, 70 provide bleed holes for the space 66.

Turning to FIGS. 3 and 6, generally, the support 54 can define a mounting portion 72 to attach the sealing member 60 to the support 54. In certain embodiments, the mounting portion 72 is further defined as plurality of mounting portions 72 cooperating with the sealing member 60 to secure the sealing member 60 to the support 54. The mounting portions 72 can be spaced from each other and can be any suitable configuration. For example, as shown in FIGS. 3 and 6, each of the mounting portions 72 can define an aperture 74 such that a plurality of parts of the sealing member 60 can be disposed through respective apertures 74. Furthermore, the first and second holes 68, 70 are spaced from the mounting portion 72, and more specifically, spaced from the mounting portions 72.

Continuing with FIGS. 3 and 6, the sealing member 60 can include coupling members 76, such as feet, spaced from each other, with each of the coupling members 76 disposed in respective apertures 74. Therefore, the parts as discussed above can be defined as the coupling members 76/feet. The coupling members 76 can be deformed to be inserted through the respective apertures 74. Therefore, when the sealing member 60 is attached to the support 54, the base 62 surrounds the first and second holes 68, 70. It is to be appreciated that the sealing member 60 can be attached to the support 54 by adhesive, over-molding, fasteners such as hooks, staples, dovetails, snap-locks, etc., or any other suitable method.

Referring to FIGS. 3 and 4, the float 38 can include an attachment member 78 extending outwardly from the first end 42. Generally, the attachment member 78 can extend from the first end 42 of the float 38 to a distal end such that the distal end of the attachment member 78 is spaced from the first end 42. In certain embodiments, the attachment member 78 is elongated and extends toward the plate 36 or the second cavity portion 34. It is to be appreciated that the attachment member 78 can be any suitable configuration.

The attachment member 78 can include a stop 80 spaced from the first end 42, with the support 54 movable along the longitudinal axis 26 between the first end 42 and the stop 80 independently of movement of the float 38 between the first and second positions. In certain embodiments, the stop 80 can be disposed between the first end 42 of the float 38 and the distal end of the attachment member 78 such that the stop 80 is spaced from both of the first end 42 and the distal end. Generally, the stop 80 can be configured to limit the amount of movement of the support 54 along the longitudinal axis 26. More specifically, the stop 80 limits the amount of movement of the support 54 along the longitudinal axis 26 while allowing the engagement portion 64 to peel away from the first seat 22 under certain conditions. This independent movement allows the drum seal 54, 60 to quickly open and close without fluttering as discussed above. One or more sections of the stop 80 can be flat, arcuate, sloped or angled, etc. It is to be appreciated that the stop 80 can be any suitable configuration.

The support 54 can include a coupler 82 (see FIGS. 3 and 4) engaging the attachment member 78 to movably couple the support 54 to the float 38. The coupler 82 can include a first finger 84 and a second finger 86 cooperating with each other to receive the attachment member 78 therebetween. Specifically, the first and second fingers 84, 86 are spaced from each other to define a gap 88 therebetween. The attachment member 78 is disposed in the gap 88 between the fingers 84, 86 such that the coupler 82 couples the support 54 to the float 38. The first and second fingers 84, 86 can bias back and forth around the attachment member 78 to attach or detach the support 54 from the attachment member 78. Under certain conditions, the coupler 82 can selectively engage the stop 80. The coupler 82 can be any suitable configuration and can be coupled to the attachment member 78 differently than discussed above. For example, the attachment member 78 can define a slot with the coupler 82 including one or more posts, fingers, hooks, or protrusions disposed through the slot to couple the support 54 to the attachment member 78.

The float 38 can further include a first column 90 and a second column 92. The attachment member 78 and the first and second columns 90, 92 are spaced from each other radially relative to the longitudinal axis 26. The first and second columns 90, 92 can be spaced from each other to define one void between the first and second columns 90, 92. The support 54 can include a first leg 94 and a second leg 96 spaced from each other and each spaced from the coupler 82. The leg 94 can be disposed in the one void between the first and second columns 90, 92. The first leg 94 can selectively engage the first column 90 and the second leg 96 can selectively engage the second column 92 to limit rotational movement of the support 54 about the longitudinal axis 26 to position the engagement portion 64 of the sealing member 60 relative to the first seat 22. More specifically, the coupler 82 can engage the attachment member 78, the first leg 94 can selectively engage the first column 90 and the second leg 96 can selectively engage the second column 92 to limit rotational movement of the support 54 about the longitudinal axis 26 to position the engagement portion 64 of the sealing member 60 relative to the first seat 22. The float 38, the first and second columns 90, 92, as well as the attachment member 78 can be integrally formed to each other or formed of one piece. Furthermore, the float 38, the first and second columns 90, 92 and the attachment member 78 can be formed of a plurality of pieces. It is to be appreciated that the first and second columns 90, 92 and the attachment member 78 can be attached to the float 38 by any suitable methods. Similarly, the support 54 and the first and second legs 94, 96 can be integrally formed to each other or formed of one piece. It is to be appreciated that the first and second legs 94, 96 can be attached to the support 54 by any suitable methods.

In certain embodiments, the float 38 can also include a ring 98 spaced from the first end 42 of the float 38 and attached to at least one of the attachment member 78 and the first and second columns 90, 92. Attached to at least one should be construed to include non-exclusive logical "or", i.e., at least one of the attachment member 78 or the first column 90 or the second column 92 or combinations thereof. In one embodiment, as shown in FIG. 3, the ring 98 is attached to the attachment member 78 and the first and second columns 90, 92. The ring 98 surrounds the first seat 22 when the float 38 is in the second position to assist in aligning the float 38 along the longitudinal axis 26 and thus minimize movement of the float 38 transverse to the longitudinal axis 26. In other words, the ring 98 and the first seat 22 cooperate to minimize play in the float 38.

Optionally, the first seat 22 can include at least one rib 100, and more specifically can include a plurality of ribs 100 (see FIG. 3), extending outwardly away from the longitudinal axis 26. Generally, the ribs 100 further assist in aligning the float 38. Therefore, the ring 98 surrounds the first seat 22 and the rib or ribs 100 when the float 38 is in the second position to assist in aligning the float 38 along the longitudinal axis 26 and minimize movement of the float 38 transverse to the longitudinal axis 26. The ring 98, the attachment member 78 and the first and second columns 90, 92 can be integrally formed to each other or formed of one piece. It is to be appreciated that the ring 98 can be attached to the attachment member 78 and/or the first and second columns 90, 92 by any suitable methods.

As best shown in FIG. 3, the support 54 can include a tail 102 extending outwardly away from the first and second fingers 84, 86 for assisting in balancing the support 54. In other words, the tail 102 generally counter-balances the coupler 82, and more specifically, the tail 102, as well as the first and second legs 94, 96 generally counter-balance the coupler 82. In certain embodiments, the tail 102 is disposed between the first and second legs 94, 96 of the support 54. The tail 102 and the support 54 can be integrally formed to each other or formed of one piece. It is to be appreciated that the tail 102 can be attached to the support 54 by any suitable methods. It is to further be appreciated that the tail 102 can be any suitable configuration and location.

Turning to FIGS. 3-6, in certain embodiments, the float 38 and the support 54 includes a centering mechanism 104 for centering the support 54 relative to the longitudinal axis 26 to position the engagement portion 64 of the sealing member 60 relative to the first seat 22. More specifically, the centering mechanism 104 acts as a gimbal to position the engagement portion 64 of the sealing member 60 in a desired orientation relative to the end face 30 of the first seat 22. For example, the support 54 gimbals relative to the longitudinal axis 26 to substantially align the engagement portion 64 with the end face 30 of the first seat 22 across the outlet 28. Therefore, when the engagement portion 64 engages the end face 30, the outlet 28 is sealed by positioning or aligning the engagement portion 64. Generally, the support 54 can gimbal at a relatively low force such that the sealing member 60 remains in the desired orientation relative to the end face 30. As such, the centering mechanism 104 can position the engagement portion 64 to assist in tightly sealing the outlet 28 when the engagement portion 64 is in the displaced position. Gimballing of the support 54 can occur as the engagement portion 64 is proximal or close to engaging the end face 30 of the first seat 22. In certain embodiments, the support 54 can gimbal from about 5.0 degrees relative to the longitudinal axis 26. It is to be appreciated that the centering mechanism 104 can be designed to allow greater than or less than 5.0 degrees of gimballing relative to the longitudinal axis 26 when desired.

Additionally, the centering mechanism 104 can position the engagement portion 64 of sealing member 60 relative to the first seat 22 such that movement of the engagement portion 64 transverse to the longitudinal axis 26 is minimized when the engagement portion 64 is in the displaced position. Simply stated, the centering mechanism 104 can minimize lateral movement of the engagement portion 64. Said differently, the centering mechanism 104 can minimize sliding movement, i.e., side to side movement, of the engagement portion 64 relative to the end face 30 of the first seat 22 when the engagement portion 64 is in the displaced position. Minimizing sliding movement also minimizes liquid fluid or fuel in the tank 12 from entering the vapor control structure 14 when the engagement portion 64 is in the displaced position.

Continuing with FIGS. 3-6, in certain embodiments, the centering mechanism 104 can include a cone 106 extending outwardly from one of the float 38 and the support 54 to a distal end 108 coaxial with the longitudinal axis 26. Furthermore, in certain embodiments, the centering mechanism 104 can define a conical aperture 110 extending into the other one of the float 38 and the support 54 to a distal surface 112 coaxial with the longitudinal axis 26. The cone 106 is disposed in the conical aperture 110 to define the gimbal for centering the sealing member 60 relative to the longitudinal axis 26 to position the engagement portion 64 relative to the first seat 22. Simply stated, the cone 106 and the conical aperture 110 cooperate with each other. In certain embodiments, the outlet 28, the distal end 108 of the cone 106 and the distal surface 112 are coaxial with the longitudinal axis 26. Aligning the distal end 108, the distal surface 112 and the outlet 28 coaxially can assist in positioning the engagement portion 64, and thus, tightly sealing the outlet 28 when the engagement portion 64 is in the displaced position. Additionally, aligning the distal end 108, the distal surface 112 and the outlet 28 coaxially can lower the force that gimbals the support 54 relative to the longitudinal axis 26. Furthermore, the cone 106 and the conical aperture 110 cooperate to assist in minimizing sliding movement that also minimizes liquid fluid or fuel in the tank 12 from entering the vapor control structure 14 when the engagement portion 64 is in the displaced position. Additionally, the distal surface 112, and thus the distal end 108, are disposed proximal to the engagement portion 64 along the longitudinal axis 26 to minimize torque or angular force being applied to the centering mechanism 104 to allow the support 54 to gimbal as desired. It is to be appreciated that the cone 106 and the conical aperture 110 are shown spaced from each other in FIGS. 4 and 5 for illustrative purposes only and one skilled in the art would recognize that the cone 106 will engage the support 54 in the conical aperture 110 when in the illustrated positions. It is to be appreciated that the centering mechanism 104 can be other configurations than discussed above, for example, the cone 106 could be configured as a pin, etc.

In one embodiment, as best shown in FIGS. 4 and 5, the float 38 includes the cone 106 and the support 54 defines the conical aperture 110. Therefore, the cone 106 extends outwardly from the first end 42 of the float 38 and the conical aperture 110 extends into the support 54. More specifically, the cone 106 extends outwardly from the first end 42 of the float 38 toward the second side 58 of the support 54 and the second side 58 of the support 54 defines the conical aperture 110 extending toward the first side 56 away from the float 38. The cone 106 and the float 38 can be integrally formed to each other or formed of one piece. It is to be appreciated that the cone 106 can be attached to the first end 42 of the float 38 by any suitable methods.

Turning to FIG. 6, the support 54 can also include a reinforcing member 114 adjacent the conical aperture 110 to reinforce or strengthen the support 54 about the conical aperture 110. In certain embodiments, the reinforcing member 114 is further defined as a plurality of reinforcing members 114, with the reinforcing members 114 spaced from each other radially about the longitudinal axis 26. Each of the reinforcing members 114 are disposed adjacent the conical aperture 110 to reinforce or strengthen the support 54 about the conical aperture 110. Generally, the reinforcing members 114 extend from the second side 58 of the support 54. The reinforcing members 114 and the support 54 can be integrally formed to each other or formed of one piece. It is to be appreciated that the reinforcing members 114 can be attached to the support 54 by any suitable methods.

Optionally, various internal components of the valve assembly 10 discussed herein can be utilized in a valve body of another configuration. For example, the float 38 (with the attachment member 78, the columns 90, 92, a portion of the centering mechanism 104, etc.), the drum seal 54, 60, and/or the fins 47 can be designed to fit inside another valve body. As another example, the plate 36 with the first seat 22 including one or more ribs 100, and optionally the head valve 48, etc. can be designed to fit inside another valve body.

The reference numbers used in the drawings and the specification and the corresponding components are as follows:
- 10 valve assembly
- 12 tank
- 13 bracket
- 14 vapor control structure
- 15 nipple
- 16 valve body
- 18 first portion
- 20 second portion
- 22 first seat
- 24 cavity
- 26 longitudinal axis
- 28 outlet
- 30 end face
- 32 first cavity portion
- 34 second cavity portion
- 36 plate
- 38 float
- 40 liquid fluid level
- 42 first end
- 44 second end
- 45 bulge
- 46 biasing member
- 47 fin(s)
- 48 head valve
- 49 end cap
- 58 second seat
- 52 blocking member
- 53 notch
- 54 support
- 56 first side
- 58 second side
- 60 sealing member
- 62 base
- 64 engagement portion
- 66 space
- 68 first hole
- 70 second hole
- 72 mounting portion
- 74 aperture
- 76 coupling members
- 78 attachment member
- 80 stop
- 82 coupler
- 84 first finger
- 86 second finger
- 88 gap
- 90 first column
- 92 second column
- 94 first leg
- 96 second leg
- 98 ring
- 100 rib(s)
- 102 tail
- 104 centering mechanism
- 106 cone
- 108 distal end
- 110 conical aperture
- 112 distal surface
- 114 reinforcing member While the best modes for carrying out the many aspects of the present teachings have been described in detail, those familiar with the art to which these teachings relate will recognize various alternative aspects for practicing the present teachings that are within the scope of the appended claims.

The invention claimed is:

1. A valve assembly comprising:
a valve body including a seat, with the seat defining an outlet;
a float disposed inside the valve body and movable between a first position and a second position relative to the valve body;
a support coupled to the float and movable with the float between the first and second positions; and
a sealing member attached to the support and having a base abutting the support, with the sealing member having an engagement portion supported by the base to define a space contained between the base, the engagement portion and the support to allow movement of the engagement portion between an initial position when the float is in the first position and a displaced position when the float is in the second position, with the engagement portion spaced from the seat when in the initial position, and with the engagement portion engaging the seat when in the displaced position such that the space decreases in size and the engagement portion deforms about the seat to cover the outlet;
wherein the float includes an attachment member, and wherein the support includes a coupler engaging the attachment member;
wherein the support has a first side and a second side opposing the first side, with the base abutting one of the first and second sides of the support;
wherein the support defines a first hole through the first and second sides such that the space is in fluid communication with inside of the valve body to equalize pressure between the space and the inside of the valve body when the engagement portion moves between the initial and displaced positions.

2. An assembly as set forth in claim 1 wherein the float includes a first end and a second end spaced from each other along a longitudinal axis, and wherein the base, the engagement portion and the first side of the support further define the space.

3. An assembly as set forth in claim 2 wherein the support defines a second hole through the first and second sides such that the space is in fluid communication with the inside of the valve body to equalize pressure between the space and the inside of the valve body when the engagement portion moves between the initial and displaced positions, with the first and second holes spaced from each other.

4. An assembly as set forth in claim 3 wherein the support includes a mounting portion to attach the sealing member to the support, with the first and second holes spaced from the mounting portion.

5. An assembly as set forth in claim 1 wherein the float includes a first column and a second column, with the attachment member and the first and second columns spaced from each other radially relative to a longitudinal axis, and wherein the support includes a first leg and a second leg spaced from the first leg, and wherein the first and second legs are each spaced from the coupler, with the first leg selectively engaging the first column and the second leg selectively engaging the second column to limit rotational movement of the support about the longitudinal axis to position the engagement portion of the sealing member relative to the seat.

6. An assembly as set forth in claim 5 wherein the float includes a first end and a second end spaced from each other along the longitudinal axis, and wherein the seat includes at least one rib extending outwardly away from the longitudinal axis, with the float including a ring spaced from the first end of the float and attached to at least one of the attachment member and the first and second columns, and with the ring surrounding the seat and the rib when the float is in the second position to assist in aligning the float along the longitudinal axis and minimize movement of the float transverse to the longitudinal axis.

7. An assembly as set forth in claim 1 wherein the float and the support includes a centering mechanism for centering the support relative to a longitudinal axis to position the engagement portion of the sealing member relative to the seat.

8. An assembly as set forth in claim 7 wherein the centering mechanism includes a cone extending outwardly from one of the float and the support to a distal end coaxial with the longitudinal axis.

9. An assembly as set forth in claim 8 wherein the centering mechanism defines a conical aperture extending into the other one of the float and the support to a distal surface coaxial with the longitudinal axis, with the cone disposed in the conical aperture for centering the sealing member relative to the longitudinal axis to position the engagement portion relative to the seat.

10. An assembly as set forth in claim 9 wherein the float includes a first end and a second end spaced from each other along the longitudinal axis, and wherein the support has a first side and a second side opposing the first side, with the float including the cone and the support defining the conical aperture, and wherein the cone extends outwardly from the first end of the float toward the second side of the support and the second side of the support defines the conical aperture extending toward the first side away from the float.

11. An assembly as set forth in claim 1 wherein the support includes a leg that extends from one end of the support and the coupler extends from another end of the support, with the ends of the support opposing each other such that the coupler is spaced from the leg, wherein the support includes a tail extending from the end of the support that opposes the coupler such that the tail generally counter-balances the coupler.

12. An assembly as set forth in claim 11 wherein the leg is further defined as a first leg, and the support includes a second leg, with the first and second legs extending from the end of the support that opposes the coupler, with the legs and the tail cooperating to counter-balance the coupler.

13. An assembly as set forth in claim 1 wherein:
the float includes a first end and a second end spaced from each other along a longitudinal axis;
the attachment member extends from the first end of the float to a distal end such that the distal end of the attachment member is spaced from the first end; and
the attachment member includes a stop disposed between the first end of the float and the distal end of the attachment member such that the stop is spaced from both of the first end and the distal end, with the stop configured to limit the amount of movement of the support along the longitudinal axis.

14. An assembly as set forth in claim 1 wherein the float includes a bulge completely surrounding an outer surface the float to face an inner surface of the valve body, with the bulge configured to minimize transverse movement of the float relative to a longitudinal axis.

15. An assembly as set forth in claim 1 wherein the valve body defines a cavity and includes a plate that splits the cavity into a first cavity portion and a second cavity portion, and wherein the seat is further defined as a first seat that extends from the plate into the first cavity portion, and wherein the float is disposed in the first cavity portion, and further including a head valve disposed in the second cavity portion, with the head valve including a second seat extending from the plate into the second cavity portion and a blocking member movably disposed relative to the second seat such that the blocking member selectively closes the outlet.

16. An assembly as set forth in claim 1 further including a centering mechanism that includes a cone extending outwardly from one of the float and the support to a distal end, and the centering mechanism defines a conical aperture extending into the other one of the float and the support to a distal surface, and wherein the cone is disposed in the conical aperture for centering the sealing member to position the engagement portion relative to the seat.

17. A valve assembly comprising:
a valve body including a seat, with the seat defining an outlet;
a float disposed inside the valve body and movable between a first position and a second position relative to the valve body;
a support coupled to the float and movable with the float between the first and second positions; and
a sealing member attached to the support and having a base abutting the support, with the sealing member having an engagement portion supported by the base to define a space between the engagement portion and the support to allow movement of the engagement portion between an initial position when the float is in the first position and a displaced position when the float is in the second position, with the engagement portion spaced from the seat when in the initial position, and with the engagement portion engaging the seat when in the displaced position such that the space decreases in size and the engagement portion deforms about the seat to cover the outlet;
wherein the float includes an attachment member, and wherein the support includes a coupler engaging the attachment member;
wherein the support has a first side and a second side opposing the first side, with the base abutting one of the first and second sides of the support;
wherein the support defines a first hole through the first and second sides such that the space is in fluid communication with inside of the valve body to equalize pressure between the space and the inside of the valve body when the engagement portion moves between the initial and displaced positions;
wherein the support includes a leg that extends from one end of the support and the coupler extends from another end of the support, with the ends of the support opposing each other such that the coupler is spaced from the leg, wherein the support includes a tail extending from the end of the support that opposes the coupler such that the tail generally counter-balances the coupler.

18. An assembly as set forth in claim 17 wherein the float and the support includes a centering mechanism for centering the support relative to a longitudinal axis to position the engagement portion of the sealing member relative to the seat.

19. An assembly as set forth in claim 17 wherein the leg is further defined as a first leg, and the support includes a second leg, with the first and second legs extending from the end of the support that opposes the coupler, with the legs and the tail cooperating to counter-balance the coupler.

20. An assembly as set forth in claim 17 wherein the float includes a first column and a second column spaced from each other to define one void between the first and second columns, with the attachment member and the first and second columns spaced from each other, and wherein the leg is disposed in the one void between the first and second columns.

21. An assembly as set forth in claim 17 wherein the support defines a plurality of apertures spaced from each other, with each of the apertures completely surrounded by a respective boundary wall, and wherein the sealing member includes a plurality of feet integral with the sealing member, and wherein each of the feet is located within a respective one of the apertures such that the feet are surrounded by the respective boundary wall to attach the sealing member to the support.

* * * * *